United States Patent
Yang

(10) Patent No.: US 9,589,265 B2
(45) Date of Patent: Mar. 7, 2017

(54) MOBILE PAYMENT METHOD

(71) Applicant: Chien-Kang Yang, Taipei (TW)

(72) Inventor: Chien-Kang Yang, Taipei (TW)

(*) Notice: Subject to any disclaimer, the term of this patent is extended or adjusted under 35 U.S.C. 154(b) by 0 days.

(21) Appl. No.: 14/680,361

(22) Filed: May 4, 2015

(65) Prior Publication Data

US 2015/0254637 A1 Sep. 10, 2015

Related U.S. Application Data

(63) Continuation-in-part of application No. 14/278,850, filed on May 15, 2014, now Pat. No. 9,202,089.

(30) Foreign Application Priority Data

| Sep. 11, 2013 | (TW) | 102217086 |
| Apr. 17, 2015 | (TW) | 104112419 |
| Apr. 17, 2015 | (TW) | 104205883 |

(51) Int. Cl.
   *G06K 7/00* (2006.01)
   *G06Q 20/32* (2012.01)
   *G06K 19/077* (2006.01)

(52) U.S. Cl.
   CPC ... *G06Q 20/3278* (2013.01); *G06K 19/07732* (2013.01); *G06K 19/07741* (2013.01); *G06Q 20/3276* (2013.01)

(58) Field of Classification Search
   CPC .. G06Q 20/322; G06Q 20/3278; G06Q 20/40; G06Q 20/20; G06Q 20/3276;
   (Continued)

(56) References Cited

U.S. PATENT DOCUMENTS

| 7,575,481 B1 | 8/2009 | Liu | |
| 2003/0120615 A1* | 6/2003 | Kuo | G06Q 20/02 705/78 |

(Continued)

FOREIGN PATENT DOCUMENTS

| CA | 2893040 A1 | 6/2014 |
| CN | 202512896 | 10/2012 |

(Continued)

OTHER PUBLICATIONS

Anonymous: "QR Code Essentials", Dec. 31, 2001, p. 1-12, XP055101415, Retrieved from the Internet: URL: https://www.nacs.org/LinkClick.aspx?fileticket=D1FpVAvJuo=&tabid=1426 &mid=4802 [retrieved on Feb. 11, 2014].

(Continued)

*Primary Examiner* — Thien M Le
(74) *Attorney, Agent, or Firm* — SmithAmundsen LLC; Stephen L. Farris; Douglas G. Gallagher

(57) ABSTRACT

A mobile payment method is to be implemented by a transaction device, and includes: receiving payment information, transmitting the payment information to a payment institution server, providing the payment information to a payment device, and receiving a payment result. The payment device is enabled to generate a payment request when the payment institution server determines that the payment information received from the payment device conforms to the payment information received from the transaction device, and to transmit the payment request to the payment institution server for subsequent processing of the payment according to the payment information included in the payment request.

9 Claims, 23 Drawing Sheets

(58) Field of Classification Search
CPC .... G06Q 20/36; G06Q 20/385; G06Q 20/405;
G06Q 20/3274; G06Q 20/4012; G06Q
20/32; G06Q 20/409; G06Q 20/3674
USPC .................................. 235/375, 380, 379, 492
See application file for complete search history.

(56) References Cited

U.S. PATENT DOCUMENTS

| | | |
|---|---|---|
| 2004/0039919 A1 | 2/2004 | Takayama et al. |
| 2005/0009564 A1 | 1/2005 | Hayaashi et al. |
| 2006/0083158 A1 | 4/2006 | Lee |
| 2007/0002807 A1 | 1/2007 | Fletcher et al. |
| 2007/0265984 A1 | 11/2007 | Santhana |
| 2007/0277044 A1 | 11/2007 | Graf et al. |
| 2008/0026614 A1 | 1/2008 | Emerson |
| 2008/0125080 A1 | 5/2008 | Phillips |
| 2008/0132201 A1 | 6/2008 | Karlberg |
| 2008/0140902 A1 | 6/2008 | Townsend |
| 2009/0061696 A1 | 3/2009 | Lin et al. |
| 2009/0089469 A1 | 4/2009 | Zeng et al. |
| 2009/0089496 A1 | 4/2009 | Huang |
| 2009/0255991 A1 | 10/2009 | Liao et al. |
| 2010/0044444 A1 | 2/2010 | Jain et al. |
| 2010/0250687 A1 | 9/2010 | Smith et al. |
| 2011/0237099 A1 | 9/2011 | Ni et al. |
| 2012/0185317 A1* | 7/2012 | Wong ................. G06Q 30/0222 705/14.23 |
| 2012/0303282 A1 | 11/2012 | Jou |
| 2013/0080219 A1* | 3/2013 | Royyuru ................. G06Q 40/02 705/14.1 |
| 2013/0214701 A1 | 8/2013 | Forgey, II |
| 2013/0256403 A1* | 10/2013 | MacKinnon Keith ... G06K 5/00 235/375 |
| 2014/0095384 A1* | 4/2014 | Basha .................. G06Q 20/385 705/44 |
| 2014/0122329 A1* | 5/2014 | Naggar .............. G06Q 20/3552 705/41 |
| 2014/0131443 A1 | 5/2014 | Smith |

FOREIGN PATENT DOCUMENTS

| | | |
|---|---|---|
| JP | 3165776 U | 2/2011 |
| JP | 3194405 U | 11/2014 |

OTHER PUBLICATIONS

European Patent Office, Search Report, Oct. 1, 2015, App. No. 15178522.7-1958.
European Search Report, Date: Jan. 22, 2015, Application No. 14171341.2, Applicant: Yang, Chien-Kang.
"The Best Approach for NFC", Jan. 1, 2013 (Jan. 1, 2013), XP055213861, Retrieved from the Internet: URL: https://www.sdcard.org/developers/overview/ASSD/smartsd/smart-microsd-intro.pdf [retrieved on Sep. 16, 2015].
Search Report of TW Patent Application No. 104105399 filed Feb. 16, 2015; issued Dec. 28, 2015.
Anonymous: "RFC 1994—PPP Challenge Handshake Authentication Protocol (CHAP)", Aug. 31, 1996 (Aug. 31, 1996), XP 055213700, Retrieved from the Internet: URL:https://tools.ietf.org/html/rfc1994 [retrieved on Sep. 16, 2015].
Wang H-2013-B42393; published Oct. 31, 2012; Multifunctional U-disk has universal serial bus interface whose end is axtended to outer surface of shell.

* cited by examiner

Store API

| Back |

ECOM Store

First Step: Input Amount

Store Number : 0809C00100

Transaction Date : 2015/01/15

Payment Number : P000011

Transaction Amount : 600

| Next |

FIG.5

| Store API | | |
|---|---|---|
| Back | ECOM Store | |

Second Step: Confirm Transaction Information by Consumer

| Store Number | 0809C00100 |
|---|---|
| Transaction Date | 2015/01/15 |
| Payment Number | P000011 |
| Transaction Amount | NT$600 |

Confirm

FIG.6A

| Back | Payment Information | Home |

Please Check Payment Information

| | |
|---|---|
| Payment Date | 2015/01/15 |
| Store Number | 0809C00100 |
| Store Name | ECOM Store |
| Payment Number | P000011 |
| Transaction Amount | NT$600 |

Confirm

FIG.9C

| Store Name | ECOM Store | Payment Number | P000011 |
|---|---|---|---|
| Store Number | 0809C00100 | Payment Serial No. | P48L000049 |
| Payment Institution Receivable Record | 2767565 | Transaction Date | 2015/01/15 |
| Transaction Time | 14:03:27 | Transaction Amount | NT$600 |

(Payment Institution) Deduction Successful

Finish

FIG.10

MOBILE PAYMENT METHOD

CROSS-REFERENCE TO RELATED APPLICATION

This application is a continuation-in-part of U.S. patent application Ser. No. 14/278,850 filed on May 15, 2014 and claiming priority of Taiwanese Patent Application No. 102217086, filed on Sep. 11, 2013.

FIELD

The disclosure relates to a mobile payment method and a mobile payment apparatus, more particularly to a mobile payment method and a mobile payment apparatus using Near Field Communication or QR code to realize secure payment for a transaction.

BACKGROUND

Electronic money or plastic money, for example, a bank card, a credit card, a debit card, a smart card, etc., is related to the use of a computer system and a digital stored value system to achieve money storage and money transfers. Since a consumer may be alleviated from the necessity of bringing too much cash to make a purchase, and since a merchant is not required to check the amount of the cash to confirm a payment for the purchase, the efficiency and convenience of transaction may be promoted. Therefore, electronic money is highly accepted and widely used in present days.

However, a conventional contactless stored value smart card usually lacks the function of card authentication, or has insufficient card authentication measures. Once a fake card is used for a payment, the merchant can only bear the loss on his/her own.

Furthermore, when the conventional contactless stored value smart card is used to make purchases, the transaction record resulting from each purchase is usually stored at the end of the merchant without being transmitted immediately to a card issuer or a financial institution for proceeding with the payment settling process. Instead, a whole batch of the transaction records is only transmitted to the card issuer or the financial institution for the payment processes at the end of a business day, i.e., batch settlement. Since procedures of this batch settlement is not sufficiently timely, chances that transaction records of a merchant do not match purchase records of a smart card may increase, exposing the merchant to the risk of loss.

SUMMARY

Therefore, an object of the disclosure is to provide a mobile payment method that allows timely payment process and that ensures secure payment for a transaction.

In a first aspect of the disclosure, the mobile payment method is to be implemented using a transaction electronic device which is configured to interact with a payment electronic device. The transaction electronic device and the payment electronic device communicate with a payment institution server. The mobile payment method includes the steps of:

receiving payment information related to a transaction and to a payment for the transaction;

transmitting the payment information to the payment institution server;

providing the payment information to the payment electronic device when the transaction electronic device and the payment electronic device are brought into proximity of each other, the payment information enabling the payment electronic device to transmit the payment information to the payment institution server for subsequent enablement of the payment electronic device to generate a payment request based on at least the payment information when the payment institution server determines that the payment information received from the payment electronic device conforms to the payment information received from the transaction electronic device, the payment request being provided for subsequent processing of the payment by the payment institution server according to the payment information included in the payment request; and receiving a payment result from the payment institution server, the payment result being generated by the payment institution server after completing the payment.

In a second aspect of the disclosure, the mobile payment method is to be implemented using a payment electronic device which is configured to interact with a transaction electronic device. The payment electronic device and the transaction electronic device communicate with a payment institution server which receives from the transaction electronic device payment information related to a transaction and to a payment for the transaction. The mobile payment method includes the steps of:

obtaining the payment information from the transaction electronic device when the payment electronic device and the transaction electronic device are brought into proximity of each other;

transmitting the payment information to the payment institution server;

generating a payment request based on at least the payment information when the payment institution server determines that the payment information received from the payment electronic device conforms to the payment information received from the transaction electronic device;

transmitting the payment request thus generated to the payment institution server, the payment request enabling the payment institution server to process the payment according to the payment information included in the payment request; and receiving a payment result from the payment institution server, the payment result being generated by the payment institution server after completing the payment.

BRIEF DESCRIPTION OF THE DRAWINGS

Other features and advantages of the disclosure will become apparent in the following detailed description of the embodiments with reference to the accompanying drawings, of which:

FIGS. 4 to 11 illustrate various messages outputted by an input/output (I/O) module of the transaction electronic device and an I/O unit of the mobile device in different stages of the mobile payment method;

DETAILED DESCRIPTION

Figure 1:
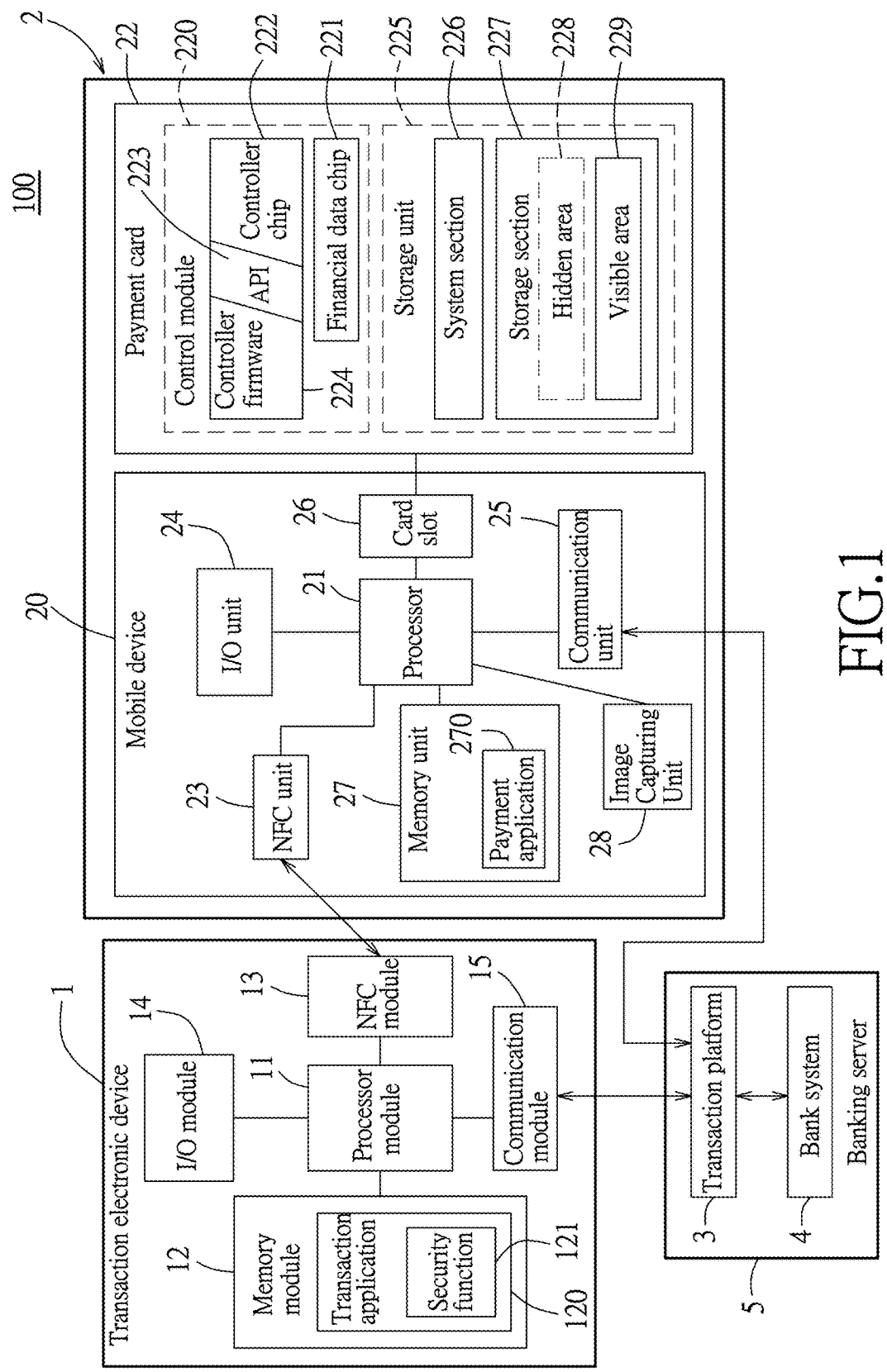
FIG. 1 is a block diagram of a system including a transaction electronic device and a payment electronic device according to the disclosure.

Before the disclosure is described in greater detail, it should be noted that like elements are denoted by the same reference numerals throughout the disclosure.

Referring to FIG. 1, an embodiment of a system 100 is adapted for implementing a mobile payment method that processes a payment related to a transaction according to the present disclosure. The system 100 includes a transaction electronic device 1 which is possessed, for example, by a merchant, and a payment electronic device 2 which is possessed, for example, by a consumer. The payment electronic device 2 includes a mobile device 20 and a payment card 22 that is removably inserted into a card slot 26 of the mobile device 20. The transaction electronic device 1 is configured to interact with the mobile device 20 provided with the payment card 22. The transaction electronic device 1 and the mobile device 20 are able to communicate with a payment institution server, which is referred to as a banking server 5 hereinafter.

Figure 2:
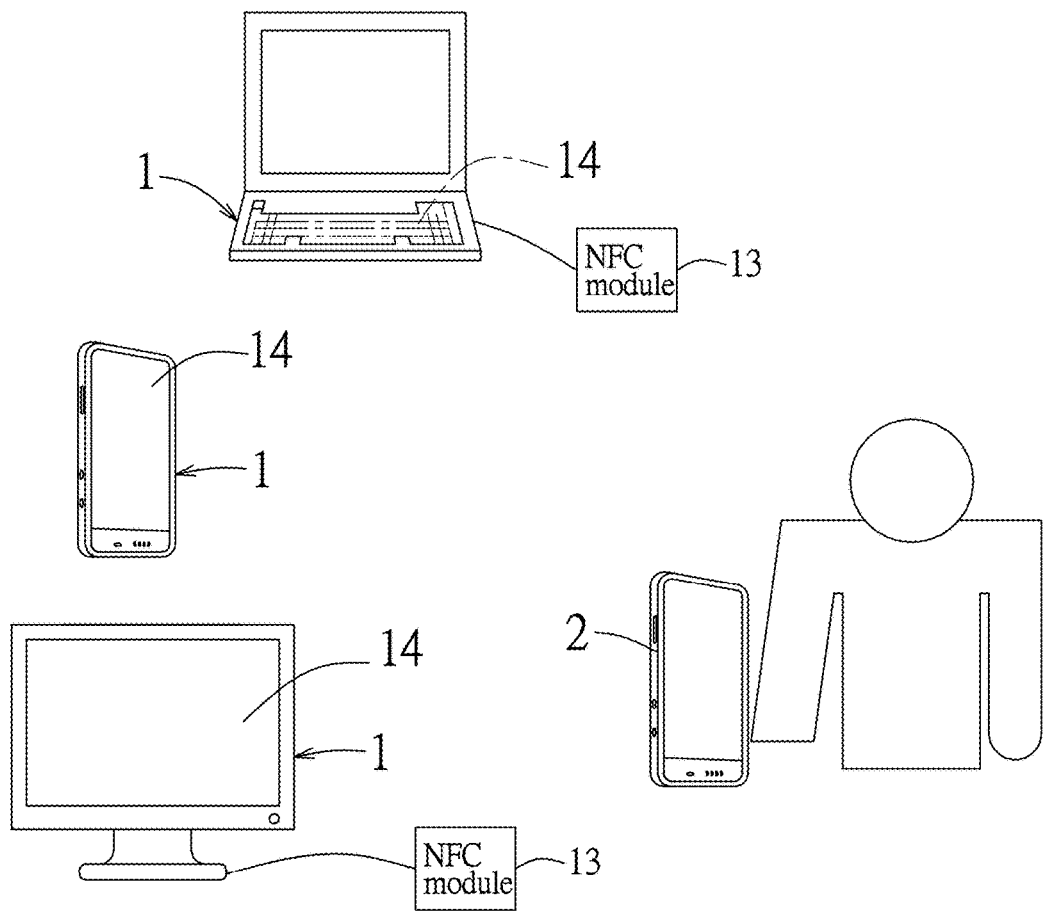
FIG. 2 is a schematic view of the payment electronic device being configured to communicate with various transaction electronic devices in the system of FIG. 1.

In this embodiment, the transaction electronic device 1 may be one of a personal computer, a laptop computer, a mobile electronic device (see FIG. 2), etc. The transaction electronic device 1 is required to include network connectivity and mechanism for executing a transaction application 120 designed for causing the electronic device 1 to perform the mobile payment method of the disclosure.

The banking server 5 may be operated by a bank that issues payment cards to customers. In this embodiment, the banking server 5 includes a transaction platform 3 for communicating with the electronic device 1 and the mobile device 20, and a bank system 4 that is coupled to the transaction platform 3. In various embodiments, the transaction platform 3 and the bank system 4 may be integrated as a single component (e.g., a server) or may be implemented as two separate components that communicate over a dedicated channel or session. Incases that the transaction platform 3 and the bank system 4 are implemented as separate components, the transaction platform 3 may be operated by a third party other then the bank.

The transaction electronic device 1 is provided with a Near Field Communication (NFC) module 13, and includes a memory module 12 that stores the transaction application 120 therein, an input/output (I/O) module 14, a communication module 15, and a processor module 11 to which the aforementioned modules 12 to 15 are coupled.

In this embodiment, the transaction electronic device 1 provided with the NFC module 13 is supportable of NFC communication functionalities, and the NFC module 13 is an external device, such as a Universal Serial Bus (USB) NFC dongle or a USB NFC reader, to be connected removably to a body of the transaction electronic device 1. Alternatively, the NFC module 13 may be a built-in module embedded in the transaction electronic device 1. The I/O module 14 may include, but is not limited to, a mouse/keyboard combination, a touch screen, a speaker/display combination, or any combination thereof. The communication module 15 enables the communication between the transaction electronic device 1 and the banking server 5.

The payment electronic device 2 is configured to interact with the transaction electronic device 1. The mobile device 20 of the payment electronic device 2 is, for example, a smart phone, a tablet computer, etc. The mobile device 20 includes a memory unit 27 that stores a payment application 270 therein, the card slot 26 that is removably inserted with the payment card 22, thereby enabling access to the payment card 22 using the mobile device 20, a short-range communication unit, such as an NFC unit 23, that is configured to communicate with the transaction electronic device 1, a communication unit 25 that is configured to communicate with the banking server 5, an I/O unit 24, an image capturing unit 28, such as a camera, and a processor 21 to which the aforementioned units 23 to 28 are coupled. Alternatively, the payment card 22 may be coupled to an interface device which is to be coupled to the mobile device 20 via an USB interface thereof so as to enable the mobile device 20 to access the payment card 22 through the interface device.

In this embodiment, the NFC unit 23 is supportable of NFC communication functionalities. The I/O unit 24 may include, but is not limited to, a mouse/keyboard combination, a touch screen, a speaker/display combination, or any combination thereof. The processor of the mobile device 20 executes the payment application 270 stored in the memory unit 27 and designed for causing the mobile device 20 to cooperate with the payment card 22 to perform the mobile payment method of the disclosure.

The transaction electronic device 1 and the mobile device 20 are able to establish wireless short-range communication, e.g., NFC communication, therebetween via the NFC module 13 and the NFC unit 23, respectively, when the transaction electronic device 1 and the mobile device 20 are brought into proximity of each other for conducting an NFC payment.

In this embodiment, the payment card 22 is embodied using a micro Secure Digital (SD) card. The payment card 22 includes a control module 220, a financial data chip 221 and a storage unit 225. The financial data chip 221 complies with the FISC II specification.

The control module 220 includes a controller chip 222, controller firmware 224 that is loaded in a read-only memory (ROM) (not shown in the drawings), and an application program interface (API) 223. The controller chip 222 and the ROM may be integrated using integrated circuit packaging, and may be juxtaposed with the storage unit 225.

When the payment card 22 is inserted into the card slot 26, the processor 21 is operable to access the financial data chip 221 and the storage unit 225 through the controller firmware 224. The API 223 and the controller firmware 224 are able to operate according to the instructions of the payment application 270. The API 223 includes functions that are able to perform encryptions using algorithms such as Triple Data Encryption Algorithm symmetric-key block cipher (3DES), Advanced Encryption Standard (AES), RSA encryption, etc.

The storage unit 225 includes a system section 226 and a storage section 227. The system section 226 is built in with basic operation information. The storage section 227 includes a hidden area 228 and a visible area 229. The visible area 229 allows access thereto by an operating system (OS) of the mobile device 20. For example, for an Android® system, the visible area 229 may be accessed using a file management program.

The hidden area 228 is not accessible by the OS, and it is not allowed to perform operations such as reading, writing or modifying content of files stored in the hidden area 228, via the OS. Instead, the hidden area 228 is only accessible by the payment application 270 via the controller firmware 224 after a certain authorization sequence has been done. Specifically, when the payment card 22 is inserted into the card slot 26 of the mobile device 20, the controller firmware 224 is configured to report to the OS that only the visible area 229 is detected. As a result, the OS will not display the hidden area 228 to a user. The hidden area 228 is accessible only when the user executes the payment application 270, and passes the authorization sequence. Since details regarding the authorization sequence may be readily appreciated by those skilled in the art, they will not be discussed herein for the sake of brevity.

The hidden area 228 stores a virtual account associated with a bank account that is between an owner of the payment card 22 and the bank which operates the banking server 5. Data regarding the bank account is stored in the financial data chip 221. In practice, the hidden area 228 may store a plurality of virtual accounts respectively associated with a plurality of bank accounts.

In cases where the mobile device 20 is not provided with the NFC unit 23, i.e., the mobile device 20 alone is not provided with an NFC capability, the payment card 22 may be configured to include the NFC capability. Specifically, in a variation of this embodiment, the payment card 22 includes a plurality of NFC pins, and is incorporated with an NFC antenna, and may be embodied as an SDIO (Secure Digital Input Output) card that supports NFC communication functionalities.

Accordingly, in the variation of this embodiment, the card slot 26 includes a plurality of NFC terminals. The NFC terminals conform with the NFC specifications ("SD Specifications Part 1 NFC Interface Simplified Addendum" issued by the SD Card Association). The NFC terminals are spaced apart from one another, and are electrically and respectively connected to the NFC pins of the payment card 22 when the payment card 22 is inserted into the card slot 26. As a result, the payment card 22 is capable of interacting with the mobile device 20 so as to enable the mobile device 20 to support NFC communication functionalities.

Figure 3:
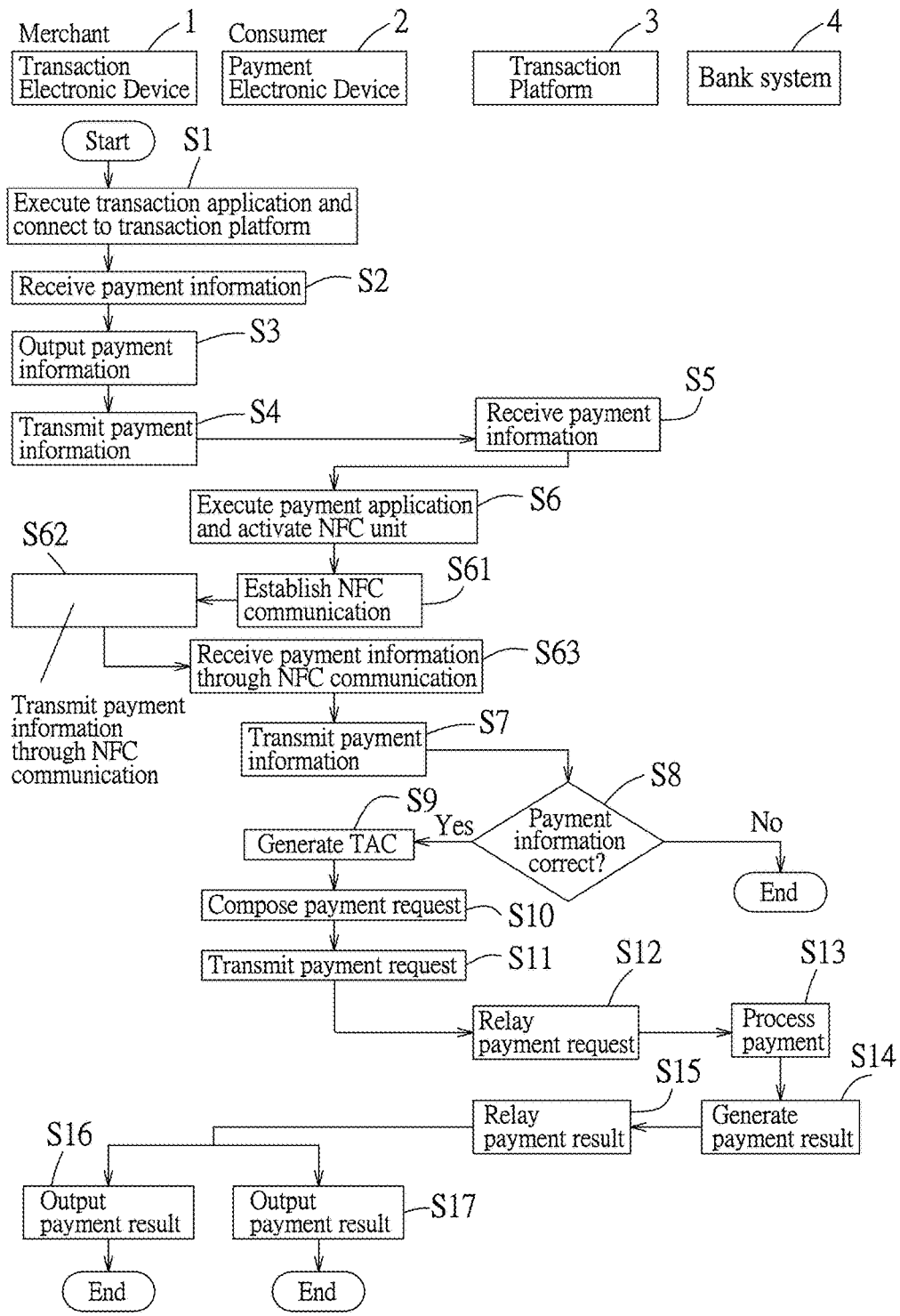
FIG. 3 is a flow chart illustrating a first embodiment of a mobile payment method according to the disclosure.

Further referring to FIG. 3, a first embodiment of the mobile payment method for processing a payment for a transaction using NFC will now be described. In the following example, the transaction electronic device 1 may be embodied using a computer, the mobile device 20 may be a smart phone inserted with the payment card 22, and the transaction is associated with purchase of goods and/or services from a store.

Figure 4:
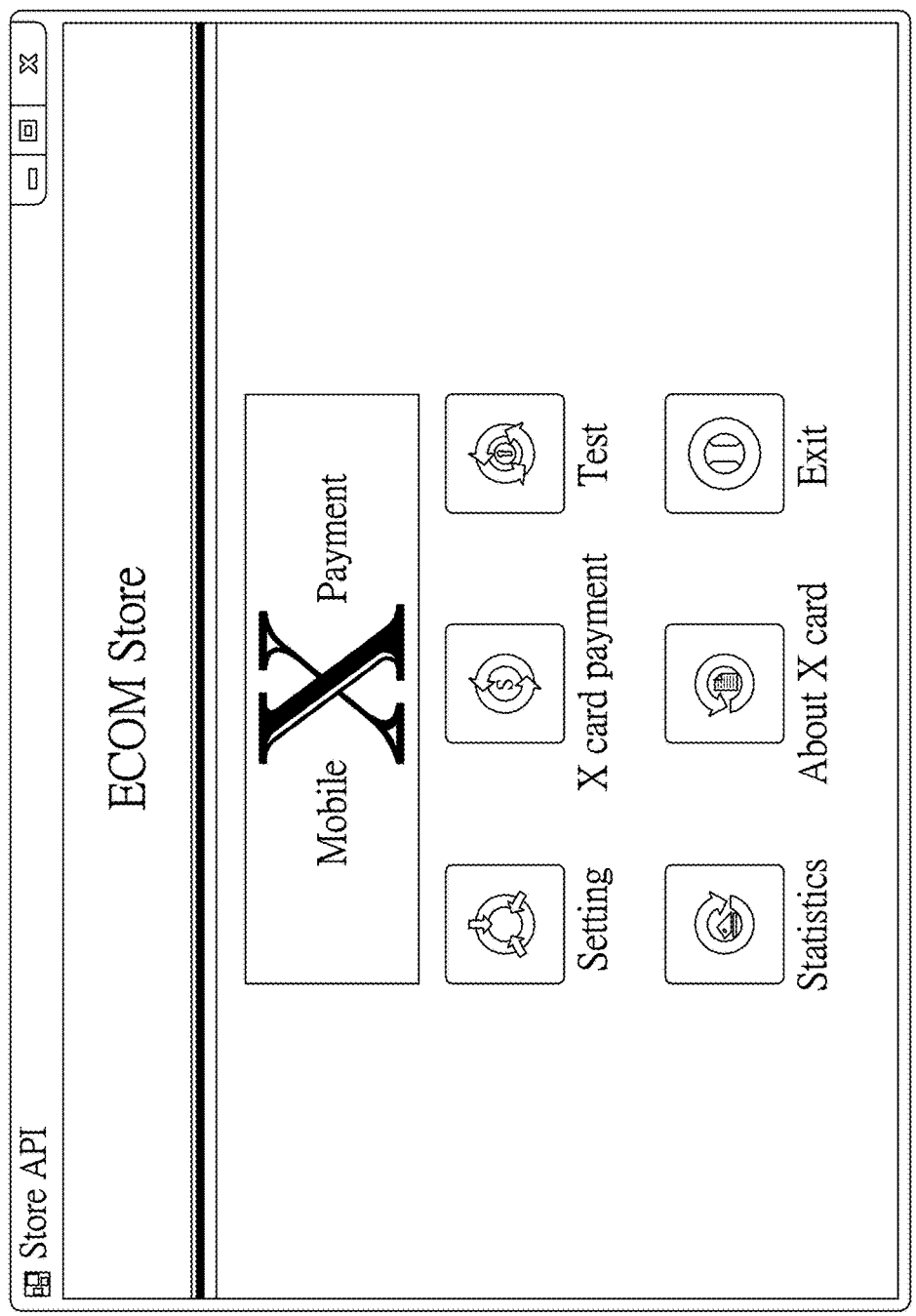

To begin with, a merchant staff at the store initiates execution of the transaction application 120 (see the main page shown in FIG. 4) using the transaction electronic device 1 and logs in to the transaction application 120.

In step S1, the processor module 11 of the transaction electronic device 1 executes the transaction application 120 stored in the memory module 12, and the transaction electronic device 1 is connected to the transaction platform 3 of the banking server 5 via the communication module 15.

The transaction application 120 provides the merchant staff with an interface (see FIG. 5) for inputting payment information related to the transaction and to the payment for the transaction. Here, the payment information includes details regarding the purchase of the goods/services (e.g., information related to the store number (e.g., identification number of the store), transaction date, payment number, transaction amount, etc.). It is noted that during the activation of the transaction application 120, the transaction electronic device 1 is configured to attempt to establish a session with the transaction platform of the banking server 5 to serve as a secure communication channel between the transaction electronic device 1 and the transaction platform 3.

In step S2, the processor module 11 receives the payment information related to the transaction and to the payment for the transaction. For example, the payment information may be inputted to the transaction electronic device 1 by scanning a barcode associated with the goods/services. Alternatively, the payment information may be inputted by the merchant staff using the transaction electronic device 1 (see FIG. 5).

In step S3, the processor module 11 of the transaction electronic device 1 outputs, via the I/O module 14, the payment information (see FIG. 6A) for confirmation by the consumer who wishes to purchase the goods/services. Once the payment information is confirmed as correct, the consumer is asked to operate the "Confirm" button for proceeding to subsequent payment procedure.

Figure 6B:
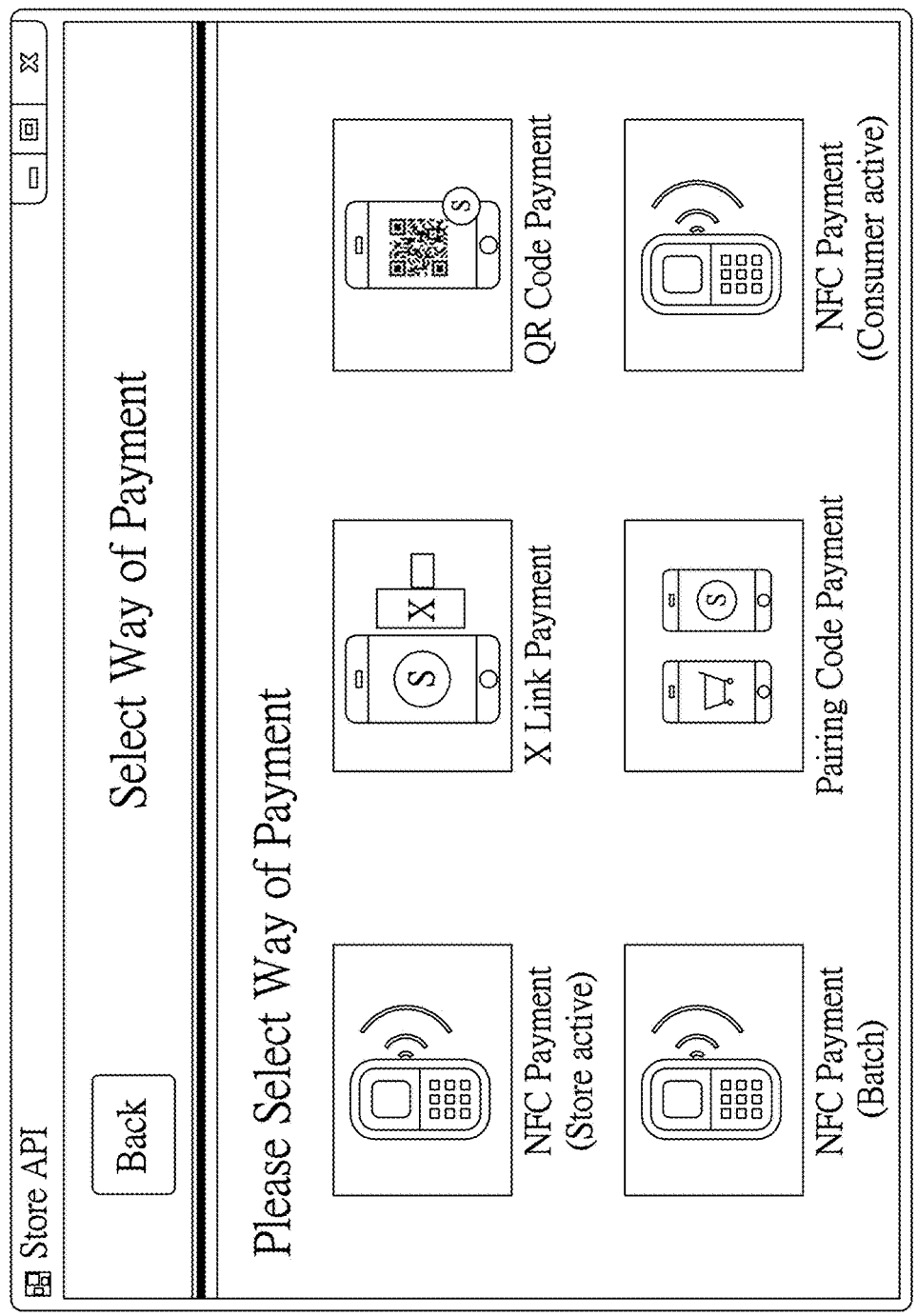

The payment method of the disclosure can be implemented in different ways, and after the "Confirm" button has been operated by the consumer, the transaction application 120 executed by the transaction electronic device 1 provides a number of ways of payment for selection by the consumer (see FIG. 6B). In this embodiment, NFC payment (consumer active) is selected by the consumer.

Figure 7:
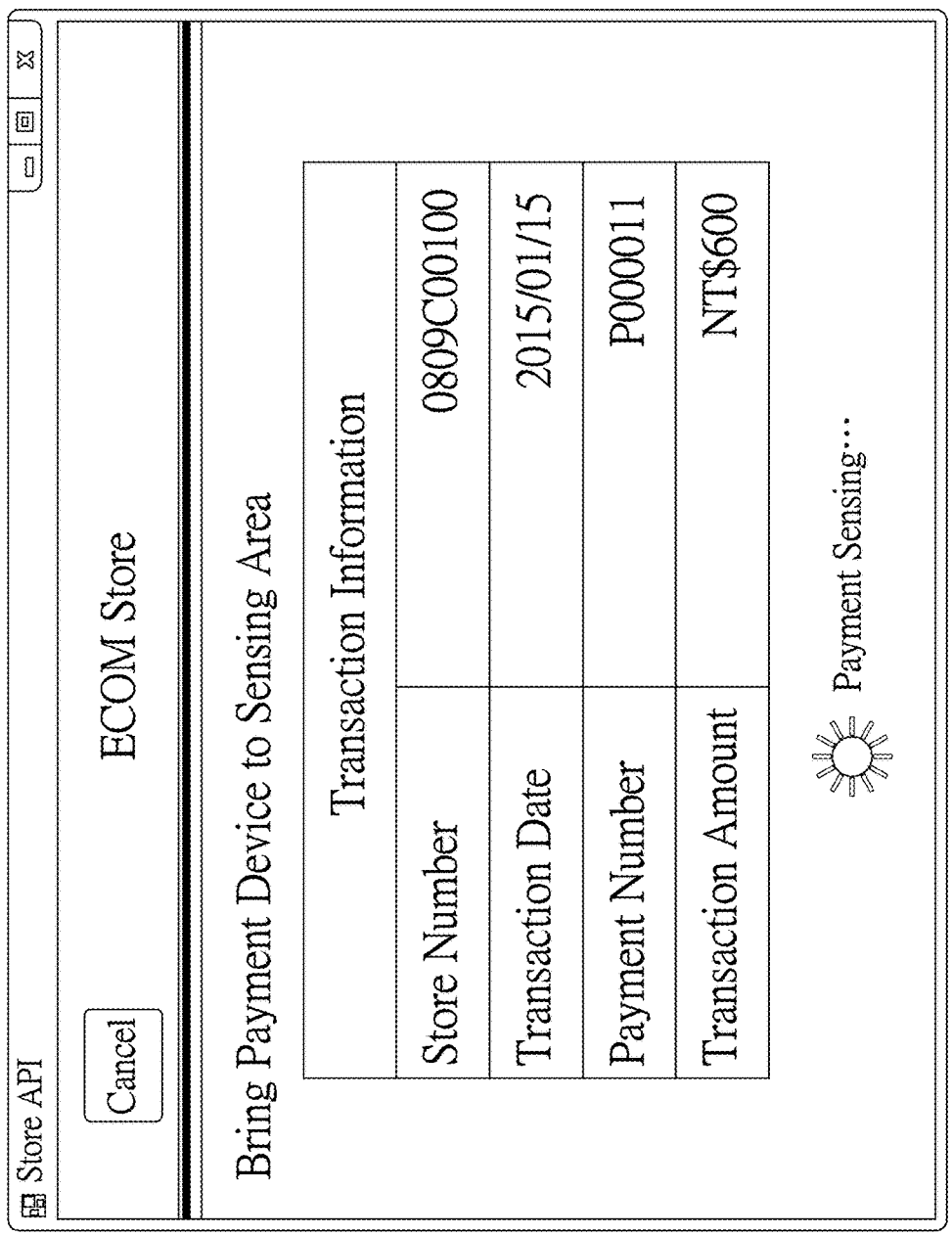

Once the NFC payment is selected by the consumer, the processor module 11 generates an instruction (see FIG. 7) to prompt the consumer to bring the mobile device 20 inserted with the payment card 22 to the proximity of a payment sensing area, i.e., the NFC module 13, of the electronic device 1. If the "Cancel" button is operated by the merchant staff, the transaction application 120 goes back to the main page, and the payment procedure terminates.

In step S4, the processor module 11 transmits the payment information to the transaction platform 3 via the communication module 15.

In step S5, the transaction platform 3 receives the payment information transmitted by the transaction electronic device 1. It is noted that the payment information may be transmitted under the session established beforehand between the transaction electronic device 1 and the transaction platform 3 of the banking server 5.

Figure 8:
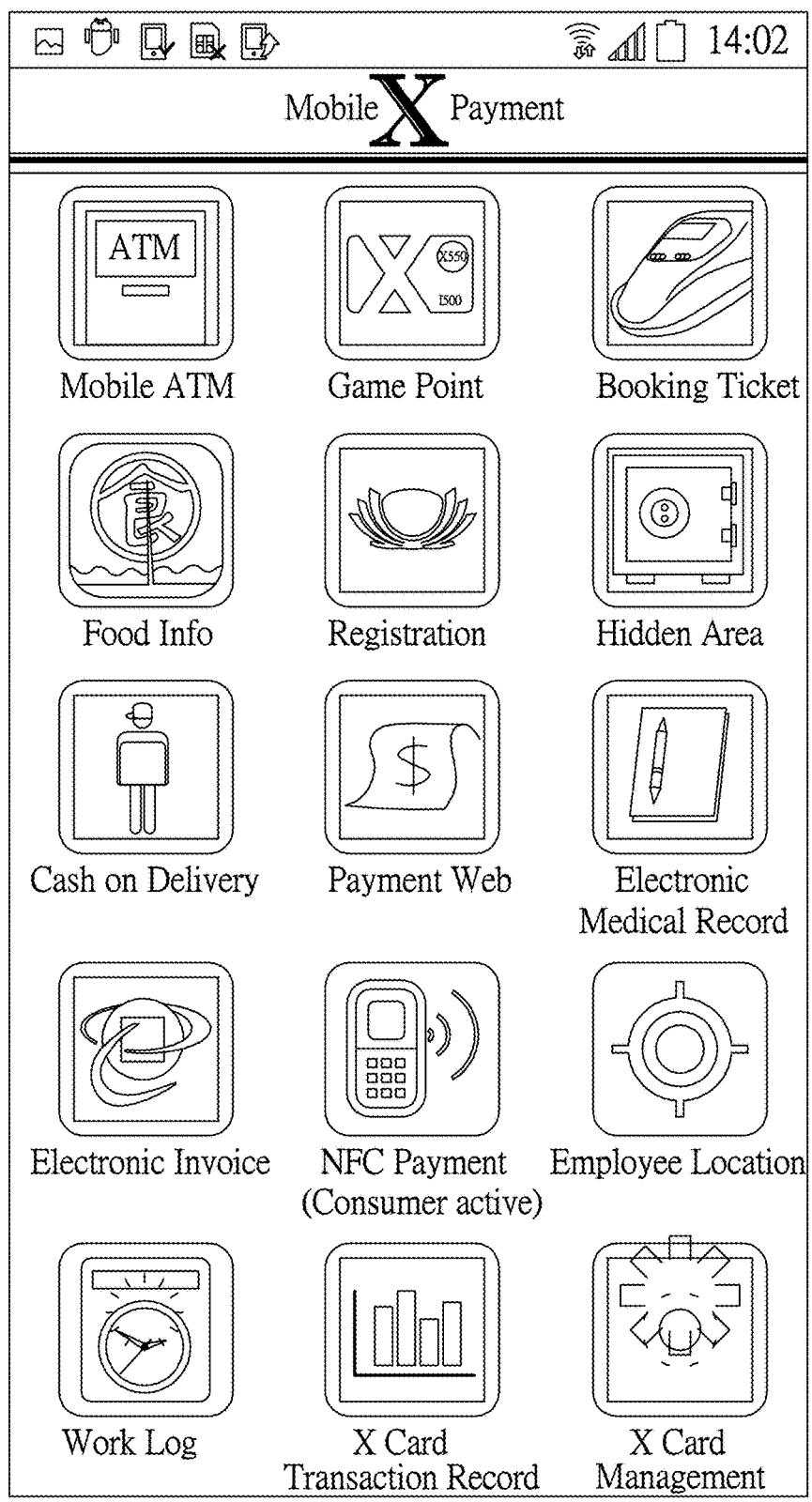

On the other hand, when the consumer intends to conduct the payment for the purchase of the goods/services using the payment electronic device 2, i.e., the mobile device 20 in combination with the payment card 22, the consumer executes the payment application 270 using the mobile device 20 (see FIG. 8), and selects "NFC Payment (consumer active)".

Therefore, in step S6, the processor 21 of the mobile device 20 executes the payment application 270 stored in the memory unit 27, and activates the NFC unit 23 to initiate the NFC communication functionalities.

Figure 9A:
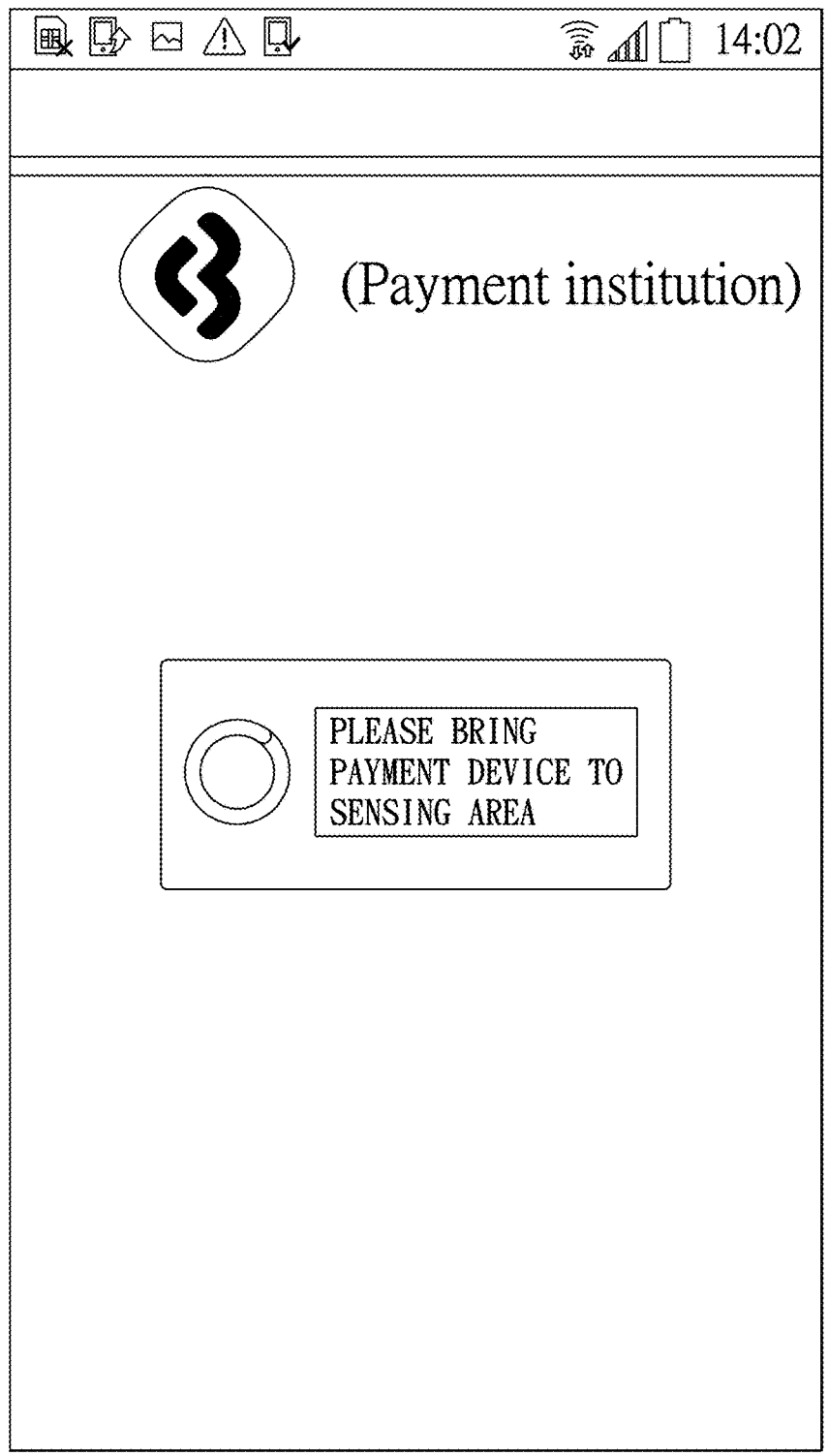

Subsequently, the consumer is prompted by the mobile device 20 to bring the mobile device 20 into proximity of the payment sensing area (i.e., the NFC module 13) of the transaction electronic device 1 (see FIG. 9A). The consumer then brings the mobile device 20 into proximity of the payment sensing area.

Afterward, in step S61, the processor 21 of the mobile device 20 automatically establishes the NFC communication with the transaction electronic device 1 via the NFC unit 23 when the mobile device 20 is brought into proximity of the transaction electronic device 1.

When the processor module 11 of the transaction electronic device 1 detects the presence of the mobile device 20 via the NFC module 13, the processor module 11 automatically establishes NFC communication with the mobile device 20 via the NFC module 13.

In step S62, after the NFC communication has been established between the transaction electronic device 1 and the mobile device 20 in step S61 (i.e., the mobile device 20 is detected by the transaction electronic device 1), during the NFC communication, the processor module 11 of the transaction electronic device 1 transmits the payment information to the mobile device 20 through the NFC communication.

In step S63, during the NFC communication, the processor 21 of the mobile device 20 receives the payment information via the NFC unit 23 through the NFC communication. The mobile device 20 subsequently transmits the payment information to the payment card 22 that is inserted into the card slot 26 of the mobile device 20.

Figure 9B:

After the mobile device 20 receives the payment information, i.e., NFC payment sensing finishes, the transaction electronic device 1 outputs an indication to notify that payment sensing finishes and the payment is being processed (see FIG. 9B). The transaction electronic device 1 then awaits a result associated with the payment from the transaction platform 3.

It is noted that the aforementioned steps S62 and S63 are performed during the NFC communication, and after these steps have been completed, an indication may be made by at least one of the transaction electronic device 1 and the mobile device 20 to notify the consumer to remove the mobile device 20 from the proximity of the transaction electronic device 1 so as to terminate the NFC communication.

Figure 9D:
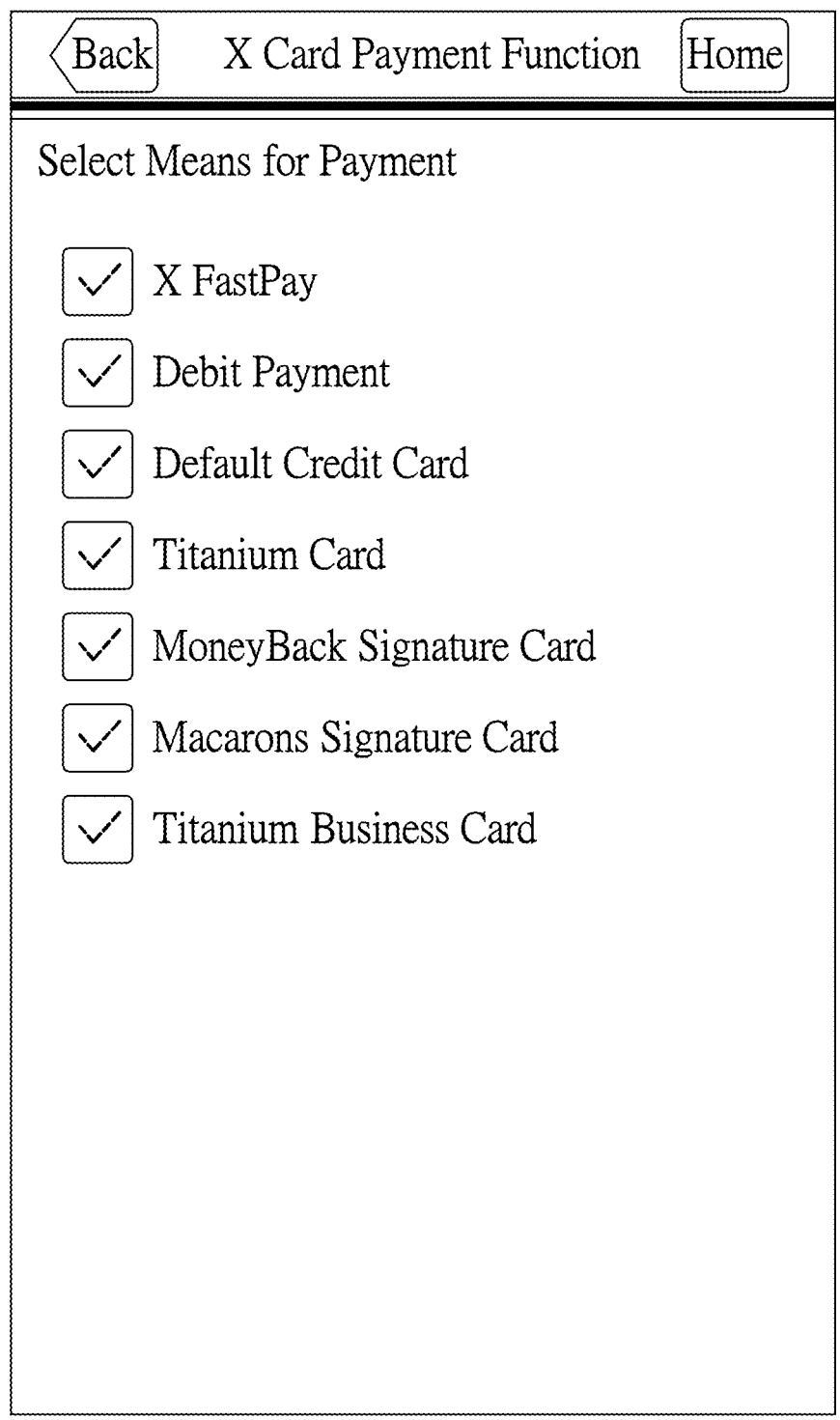
Figure 9E:

On the other hand, the mobile device 20 outputs a message associated with the payment information for confirmation by the consumer (see FIG. 9C). When the payment information is confirmed as correct, the consumer may operate the "Confirm" button; otherwise, the "Back" button may be operated. Afterwards, the mobile device 20 outputs a message containing a number of means (bank account, credit card, etc.) to be selected for being used to make the payment (see FIG. 9D). Once one of the means is selected by the consumer, the mobile device 20 outputs a message containing the payment information and the means selected to make the payment for confirmation by the consumer (see FIG. 9E). The consumer may operate the "Confirm payment" button upon confirming the message as correct; otherwise, the "Back" button may be operated.

In step S7, the mobile device 20 is configured to establish a session between the mobile device 20 and the transaction platform 3 similar to that between the transaction electronic device 1 and the transaction platform 3. Subsequently, the processor 21 of the mobile device 20 transmits the payment information received in step S63 to the transaction platform 3 though the session thus generated via the communication unit 25. Specifically, the transmission is executed using Secured Sockets Layer (SSL) protocol.

In step S8, after receiving the payment information from the mobile device 20, the transaction platform 3 determines whether the payment information received from the mobile device 20 in step S7 conforms to the payment information received from the transaction electronic device 1 in step S5. When a result of the determination made by the transaction platform 3 is affirmative, it means that the payment information was not altered during transmission, and the transaction platform 3 transmits to-be-authenticated data through the session established in step S7 to the mobile device 20. The to-be-authenticated data is generated by the transaction platform 3 and includes the payment information.

Figure 9F:
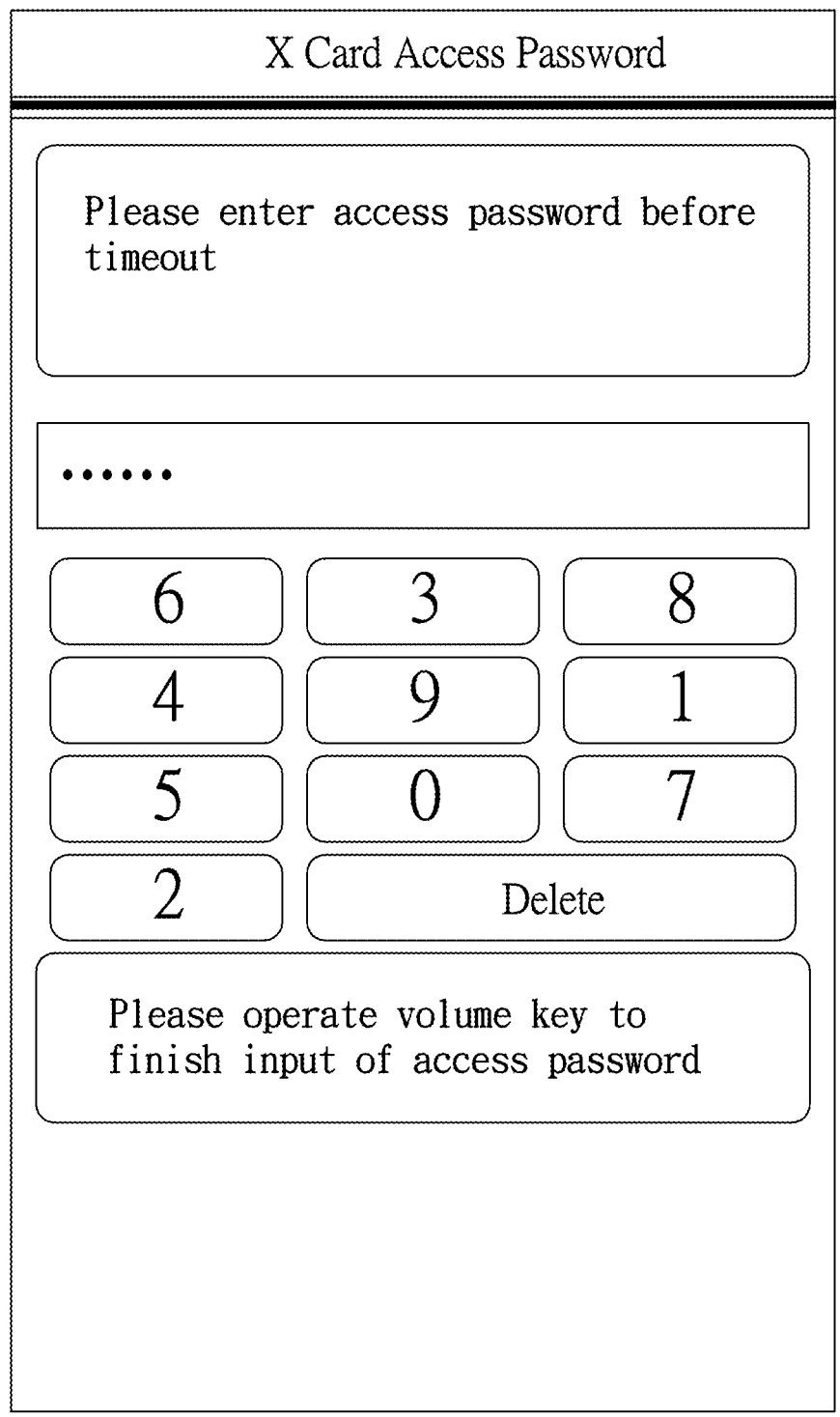
Figure 9G:
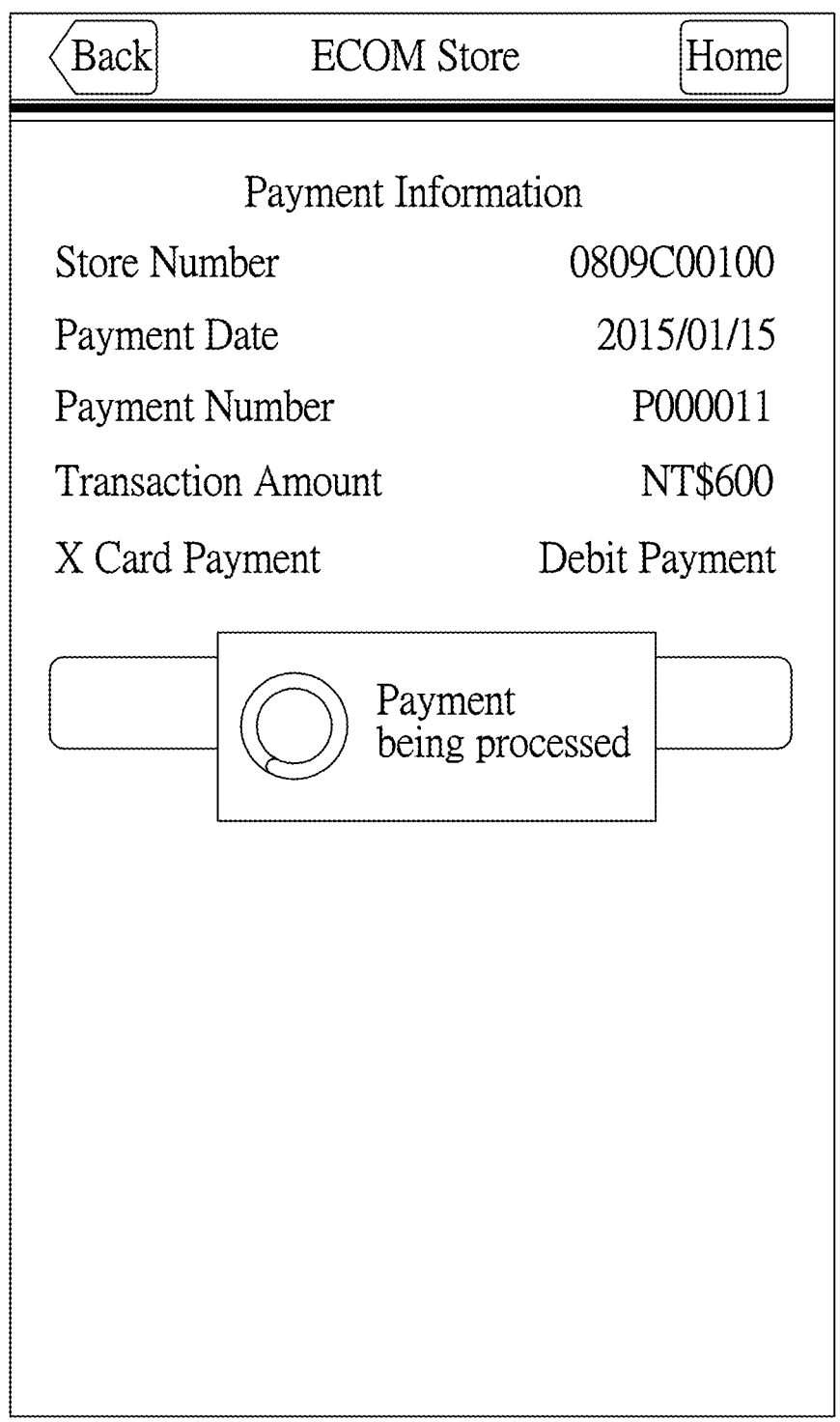

In step S9, after receiving the to-be-authenticated data from the transaction platform 3, the mobile device 20 outputs a message to require user input of an access password associated with the payment card 22 (see FIG. 9F). The consumer then operates a volume key of the mobile device 20 to finish input of the access password, and the mobile device 20 transmits the to-be-authenticated data thus received and the access password to the payment card 22. Subsequently, the payment card 22 is configured to verify the access password. When it is verified by the payment card 22 that the access password is correct, the payment card 22 generates a transaction authentication code (TAC) based on the to-be-authenticated data received from the mobile device 20 using a secret key stored in the payment card 22, and transmits the TAC thus generated to the mobile device 20. In response to receipt of the TAC, the mobile device 20 outputs a message to notify that the payment is being processed (see FIG. 9G).

When it is verified by the payment card 22 that the access password is incorrect, the payment card 22 requires user input of the access password once again, and counts a number of consecutive occasions that an incorrect access password is received. When the number thus counted is equal to or greater than a threshold, for example, three, the payment card 22 is locked and access to the payment card 22 is prohibited.

Specifically, the payment card 22 stores, in one of the financial data chip 221 and the hidden area 228, a secret key corresponding to the virtual account which the consumer intends to use for payment. As such, the payment card 22 retrieves the secret key based on the virtual account for generating the TAC. It is noted that the bank system 4 of the banking server 5 is provided with the same secret key corresponding the virtual account for subsequent identification of validity of the payment card 22.

In step S10, the processor 21 of the mobile device 20 executing the payment application 270 composes a payment request using the TAC in response to receipt of the TAC from the payment card 22. The payment request includes at least the virtual account, the payment information and the TAC, and is encrypted.

In step S11, the processor 21 of the mobile device 20 transmits the payment request thus generated to the transaction platform 3 via the communication unit 25.

It is noted that the payment request may be transmitted to the transaction platform 3 under a session established previously therebetween. Specifically, the transmission is executed using Secured Sockets Layer (SSL) protocol.

In step S12, after receiving the payment request from the mobile device 20, the transaction platform 3 relays the payment request to the bank system 4 under a session established previously therebetween, and the flow proceeds to step S13.

In step S13, the bank system 4 processes the payment according to the transaction information included in the payment request in response to receipt of the payment request. In this case, a value of the goods/services (in this case, NT$600) is deducted from the bank account that is represented by the virtual account included in the payment request, and is transferred to an account owned by the store.

It is noted that the bank system 4 is operable to decrypt the received payment request, and to identify validity of the payment card 22 based on the TAC included in the payment request.

Then, in step S14, the bank system 4 generates a payment result indicating that the payment has been processed, and transmits the payment result to the transaction platform 3.

In turn, in step S15, the transaction platform 3 relays the payment result to the transaction electronic device 1 and the mobile device 20.

Afterward, in step S16, in response to receipt of the payment result, the processor module 11 of the transaction electronic device 1 outputs, via the I/O module 14, the payment result (see FIG. 10) to notify the merchant staff of a result of the payment. In this way, the payment is processed, and the customer may obtain the goods/services.

Figure 11:
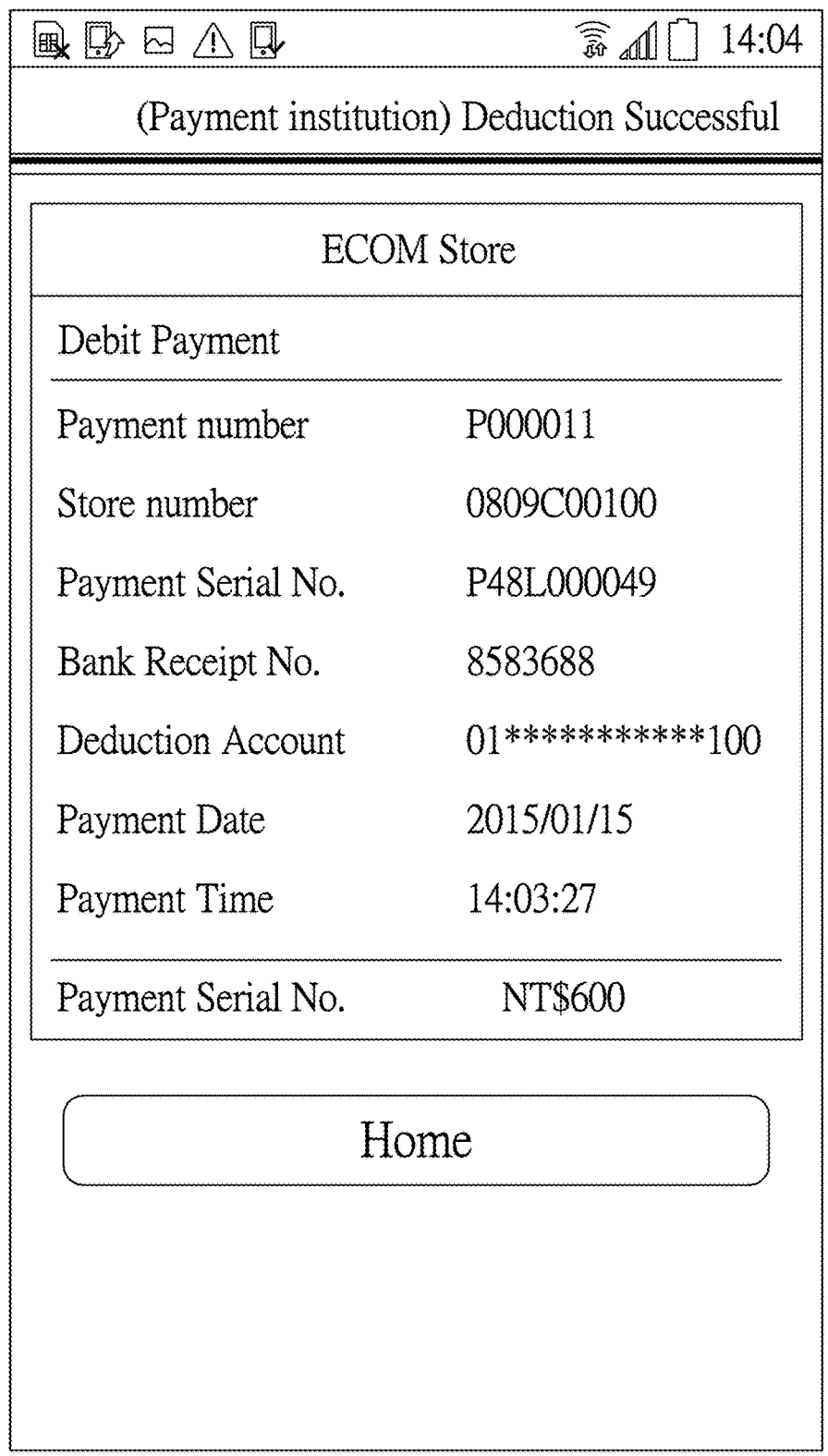

Similarly, in step S17, in response to receipt of the payment result, the processor 21 of the mobile device 20 outputs, via the I/O unit 24, the payment result (see FIG. 11) to notify the consumer of the result of the payment.

Figure 12:
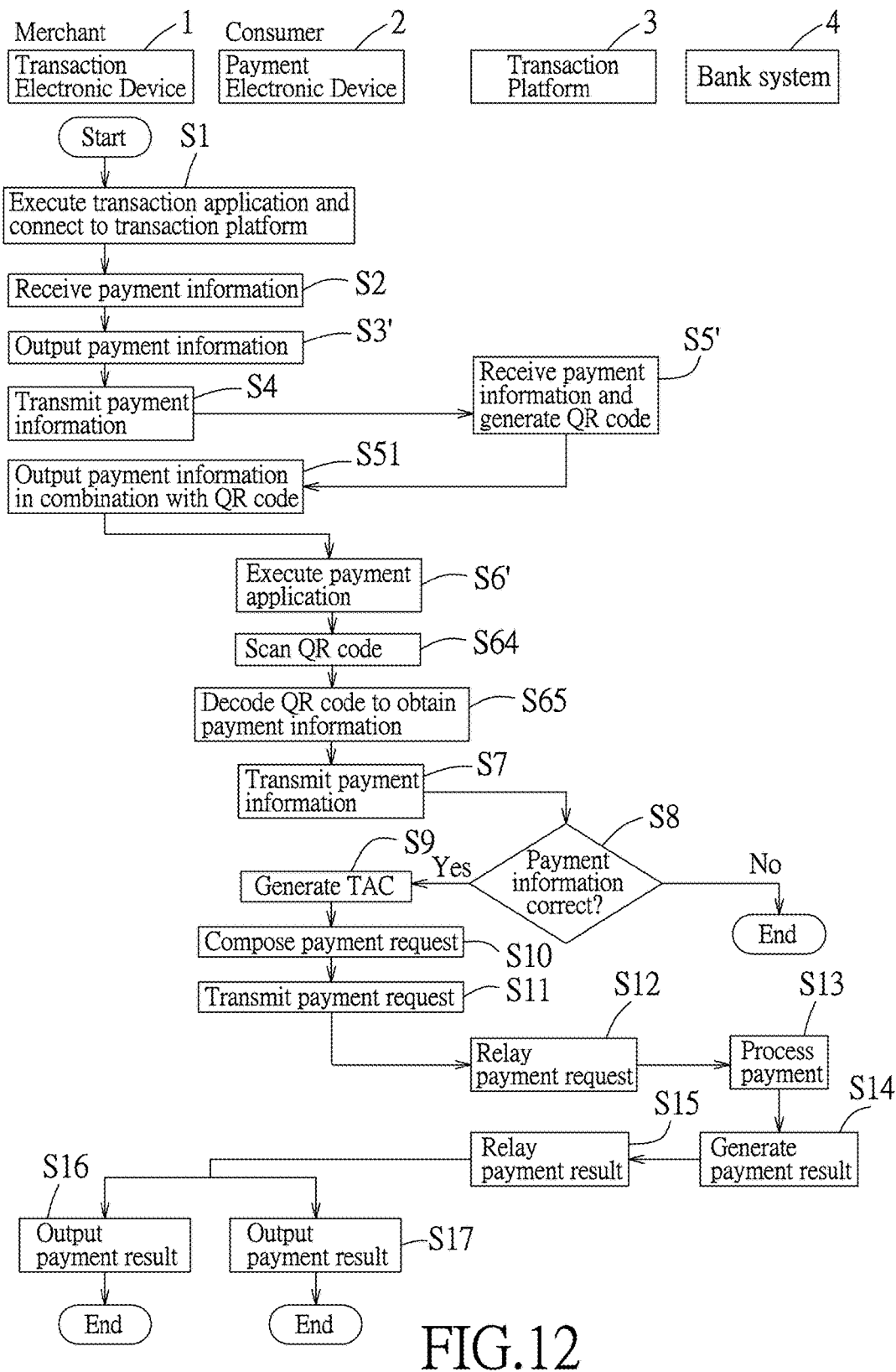
FIG. 12 is a flow chart illustrating a second embodiment of a mobile payment method according to the disclosure.

Referring to FIG. 12, a second embodiment of the mobile payment method for processing a payment for a transaction using QR code will now be described. The second embodiment of the mobile payment method is similar to that of the first embodiment, and the differences therebetween reside in the following steps.

In step S3', the processor module 11 of the transaction electronic device 1 outputs, via the I/O module 14, the payment information (see FIG. 6A) for confirmation by the consumer, and provides the number of ways of payment for selection by the consumer after the payment information has been confirmed by the consumer. when QR code payment is selected by the consumer (see FIG. 6B), the flow proceeds to step S4 in which the processor module 11 transmits the payment information to the transaction platform 3 via the communication module 15.

In step S5', after receiving the payment information transmitted by the transaction electronic device 1, the transaction platform 3 generates a barcode according to the payment information, and transmits the barcode thus generated to the transaction electronic device 1. In this embodiment, the barcode generated by the transaction platform 3 is a QR code.

Figure 13:
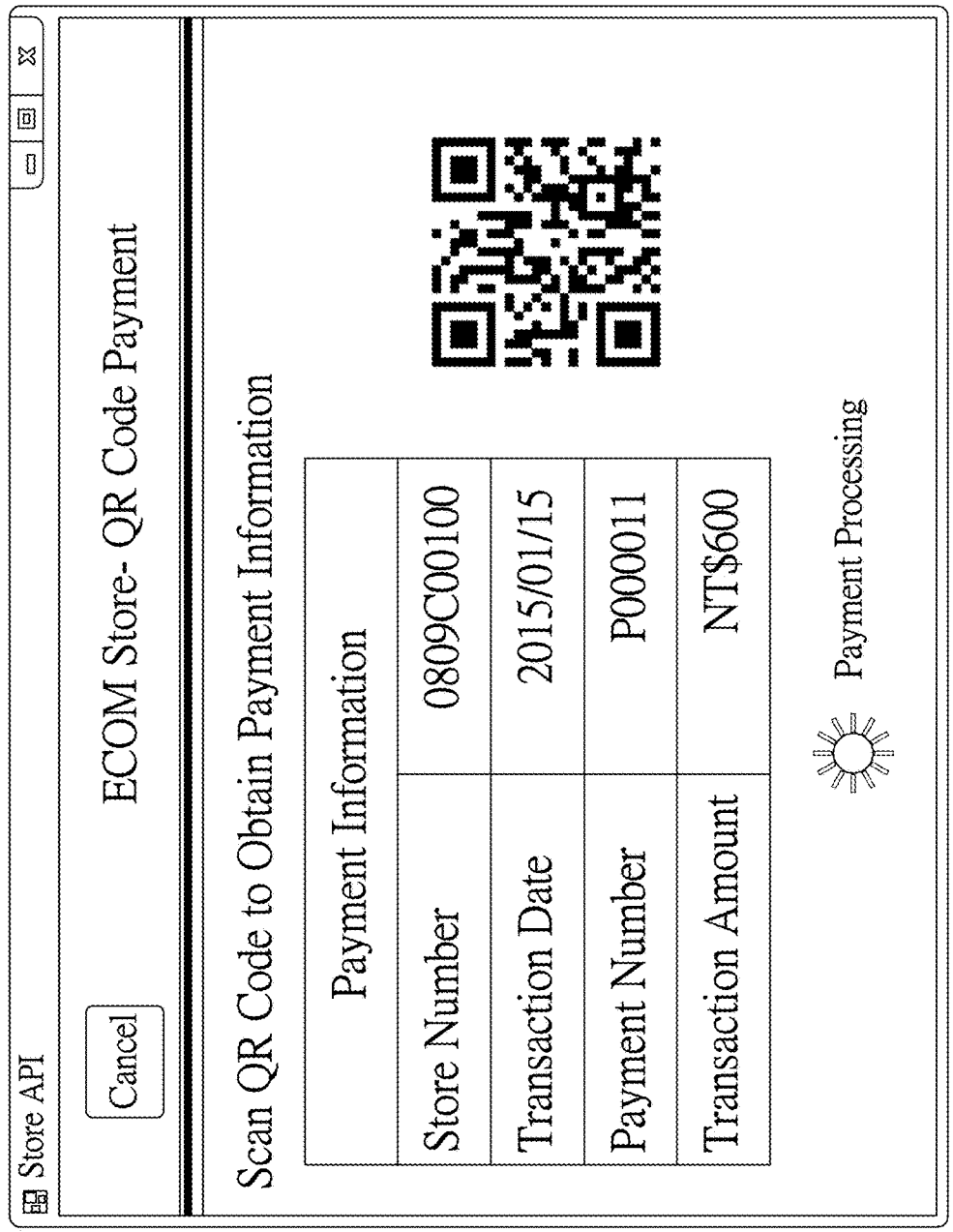
FIGS. 13 to 16 illustrate messages that are outputted by the I/O module of the transaction electronic device and the I/O unit of the mobile device in different stages of the mobile payment method associated with a QR code.

In step S51, in response to receipt of the QR code generated and transmitted by the transaction platform 3, the processor module 11 executing the transaction application 120 generates an instruction, and outputs, via the I/O module 14, the instruction including the payment information in combination with the QR code (see FIG. 13) to prompt the consumer to operate the mobile device 20 to scan the QR code using the image capturing unit 28 of the mobile device 20. If the "Cancel" button is operated by the merchant staff, the transaction application 120 goes back to the main page, and the payment procedure terminates.

Figure 14:

When the consumer intends to conduct the payment for the purchase of the goods/services by QR code payment using the payment electronic device 2, i.e., the mobile device 20 in combination with the payment card 22, the consumer initiates execution of the payment application 270 using the mobile device 20, and selects "QR Code payment" (see FIG. 14).

Therefore, in step S6', the processor 21 of the mobile device 20 executes the payment application 270 stored in the memory unit 27.

Figure 15:
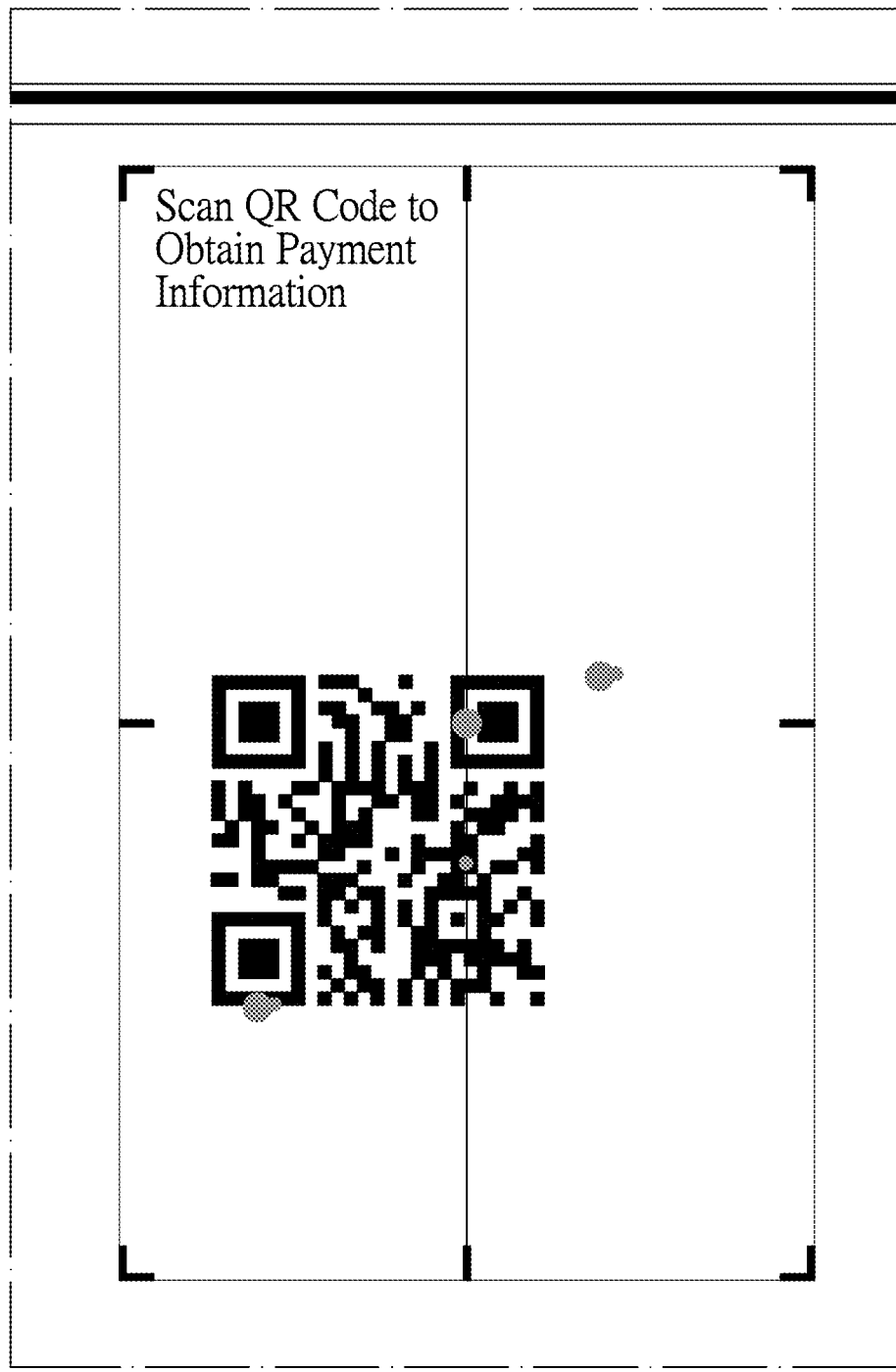

In turn, in step S64, the image capturing unit 28 of the mobile device 20 is operated to scan the QR code outputted by the I/O module 14 of the transaction electronic device 1 (see FIG. 15).

Figure 16:
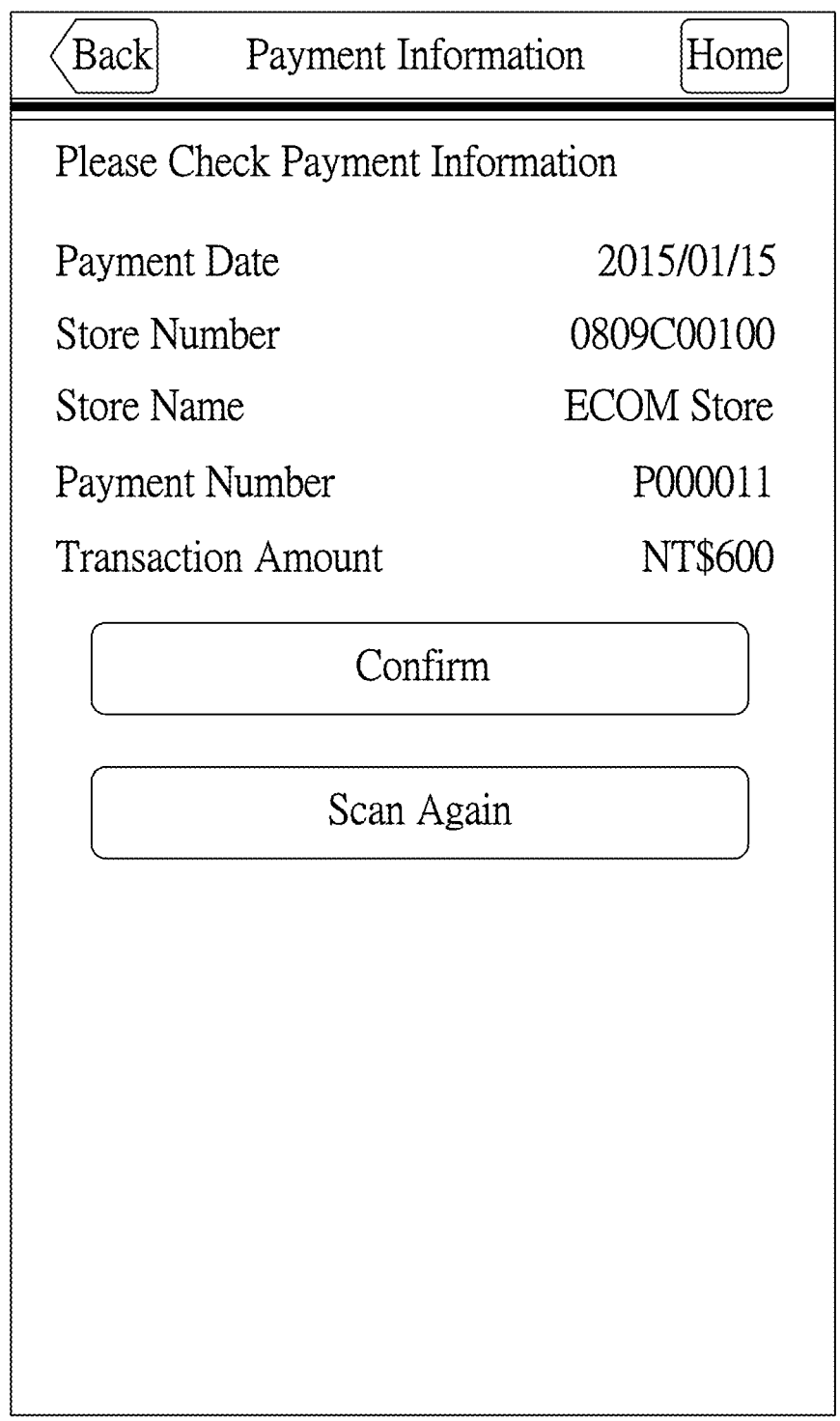

Afterward, in step S65, the processor 21 of the mobile device 20 decodes the QR code scanned by the image capturing unit 28 so as to obtain the payment information corresponding to the QR code, and outputs a message associated with the payment information for confirmation by the consumer (see FIG. 16). When the payment information is confirmed as correct, the consumer may operate the "Confirm" button; otherwise, the "Back" button may be operated. The flow then proceeds to step S7. Since the rest of the steps of the second embodiment are similar to those of the first embodiment, detailed descriptions of the same are omitted herein for the sake of brevity.

In one example, the mobile payment method is applicable in cases where the goods/services are provided to the customer via delivery, and the payment is made after the goods/services have been delivered, i.e., cash on delivery. A delivery personnel may bring along a transaction electronic device 1 installed with the transaction application 120, and after the customer confirms the goods/services, operate the transaction electronic device 1 to perform the mobile payment method. As a result, the delivery personnel is not required to bring cash during the trip.

The mobile payment method is also applicable incases where the goods/services are provided to the customer by a vending machine. After the payment is carried out in step S14, the vending machine provides the goods.

Further, the mobile payment method of the disclosure may be applicable to money transfer using two smart phones. For example, a remittee operates a first smart phone to execute the transaction application 120 to cause the first smart phone to perform the aforementioned steps associated with the transaction electronic device 1, and a remitter operates a second smart phone inserted with a payment card to execute the payment application 270 to cause the second smart phone to performed the aforementioned steps associated with the mobile device 20 and the payment card 22, so as to achieve money transfer using two smart phones by simply contacting them together/bringing them into proximity of each other, or scanning a QR code.

To sum up, by comparing the payment information received from the mobile device 20 with the payment information received from the transaction electronic device, payment information altered during transmission can be detected. Moreover, by transmitting the payment request corresponding to the payment information to the banking server in real time, each payment for the transaction can be processed timey. In this way, losses resulting from payment fraud or transaction records mismatch may be prevented.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A mobile payment method to be implemented using a transaction electronic device which is configured to interact with a payment electronic device, the transaction electronic device and the payment electronic device communicating with a payment institution server, the mobile payment method comprising the steps of:

receiving payment information related to a transaction and to a payment for the transaction;

transmitting the payment information to the payment institution server, the payment information enabling the payment institution server to generate a barcode according to the payment information in response to receipt of the payment information, and to transmit the barcode thus generated to the transaction electronic device;

providing the payment information to the payment electronic device when the transaction electronic device and the payment electronic device are brought into proximity of each other, the payment information enabling the payment electronic device to transmit the payment information to the payment institution server for subsequent enablement of the payment electronic device to generate a payment request based on at least the payment information when the payment institution server determines that the payment information received from the payment electronic device conforms to the payment information received from the transaction electronic device, the payment request being provided for subsequent processing of the payment by the payment institution server according to the payment information included in the payment request; and receiving a payment result from the payment institution server, the payment result being generated by the payment institution server after completing the payment.

2. The mobile payment method according to claim 1, the transaction electronic device and the payment electronic device being provided with Near Field Communication (NFC) capabilities, wherein the step of providing the payment information includes:

automatically establishing NFC communication with the payment electronic device when the transaction electronic device and the payment electronic device are brought into proximity of each other; and during the NFC communication, transmitting the payment information to the payment electronic device through the NFC communication.

3. The mobile payment method according to claim 1, wherein, in the step of generating a barcode, a QR code is generated according to the payment information to serve as the barcode.

4. The mobile payment method according to claim 1, wherein the step of providing the payment information includes:

receiving the barcode from the payment institution server; and outputting the barcode, which when scanned and decoded by the payment electronic device, enables the payment electronic device to obtain the payment information corresponding to the barcode.

5. The mobile payment method according to claim 1, wherein, in the step of providing the payment information, the payment information further enables the payment electronic device to:

receive from the payment institution server to-be-authenticated data which is generated by the payment institution server according to the payment information;

generate a transaction authentication code (TAC) based on the to-be-authenticated data; and compose the payment request using the TAC.

6. A mobile payment method to be implemented using a payment electronic device which is configured to interact with a transaction electronic device, the payment electronic device and the transaction electronic device communicating with a payment institution server which receives from the transaction electronic device payment information related to a transaction and to a payment for the transaction, the payment institution server generating a barcode according to the payment information in response to receipt of the payment information, and transmitting the barcode thus generated to the transaction electronic device, the transaction electronic device outputting the barcode after receiving the barcode from the payment institution server, the mobile payment method comprising the steps of:

obtaining the payment information from the transaction electronic device by scanning the barcode outputted by the transaction electronic device using the payment electronic device and by decoding the barcode so as to obtain the payment information corresponding to the barcode when the payment electronic device and the transaction electronic device are brought into proximity of each other;

transmitting the payment information to the payment institution server;

generating a payment request based on at least the payment information when the payment institution server determines that the payment information received from the payment electronic device conforms to the payment information received from the transaction electronic device;

transmitting the payment request thus generated to the payment institution server, the payment request enabling the payment institution server to process the payment according to the payment information included in the payment request; and receiving a payment result from the payment institution server, the payment result being generated by the payment institution server after completing the payment.

7. The mobile payment method according to claim 6, the transaction electronic device and the payment electronic device being provided with Near Field Communication (NFC) capabilities, wherein the step of obtaining the payment information includes:

automatically establishing NFC communication with the transaction electronic device when the payment electronic device and the transaction electronic device are brought into proximity of each other; and during the NFC communication, receiving the payment information transmitted by the transaction electronic device through the NFC communication.

8. The mobile payment method according to claim 6, wherein, in the step of obtaining the payment information, the barcode scanned and decoded by the payment electronic device is a QR code.

9. The mobile payment method according to claim 6, wherein the step of generating a payment request includes:

receiving from the payment institution server to-be-authenticated data which is generated by the payment institution server according to the payment information;

generating a transaction authentication code (TAC) based on the to-be-authenticated data; and composing the payment request using the TAC.

* * * * *